(12) United States Patent
Gushwa et al.

(10) Patent No.: US 9,872,588 B2
(45) Date of Patent: *Jan. 23, 2018

(54) BLENDER JAR COLLARS AND INTERLOCKS

(71) Applicant: WHIRLPOOL CORPORATION, Benton Harbor, MI (US)

(72) Inventors: David J. Gushwa, Mishawaka, IN (US); Jason P. Kachorek, St. Joseph, MI (US); Everett Sidney Kettle, Portage, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,807

(22) Filed: Dec. 7, 2016

(65) Prior Publication Data

US 2017/0079477 A1 Mar. 23, 2017

Related U.S. Application Data

(62) Division of application No. 14/561,665, filed on Dec. 5, 2014, now Pat. No. 9,527,052.

(51) Int. Cl.
*A47J 43/07* (2006.01)
*A47J 43/042* (2006.01)
(Continued)

(52) U.S. Cl.
CPC ......... *A47J 43/0766* (2013.01); *A47J 43/042* (2013.01); *A47J 43/046* (2013.01);
(Continued)

(58) Field of Classification Search
CPC . A47J 43/0766; A47J 43/046; B01F 13/1041; B01F 15/00733; B01F 15/00831; B01F 2215/0026
See application file for complete search history.

(56) References Cited

U.S. PATENT DOCUMENTS 3,612,126 A 10/1971 Emmons et al.
7,909,501 B2 3/2011 Eden
(Continued)

FOREIGN PATENT DOCUMENTS

AU 2005201023 B2 9/2005

*Primary Examiner* — R. K. Arundale
*Assistant Examiner* — Joseph Finan, Jr.

(57) ABSTRACT

A blender collar assembly including a plunger moveable between a lower position where a blade assembly is prevented from coupling with a motor, and an upper position where the blade assembly is able to couple with the motor. The plunger includes an arm extending upward and having a u-shaped feature, and a protrusion associated with the u-shaped feature. The assembly further includes a concentric interlock ring rotating responsive to rotation of a blender jar. The interlock ring including a first portion engaging the u-shaped feature preventing the plunger from moving upward, a second gap portion not engaging the u-shaped feature enabling the plunger to move upward and downward within the collar, and a key engaging a protrusion of the blender jar as the plunger moves upward preventing the interlock ring from rotating while the second portion is rotationally aligned with the u-shaped feature.

11 Claims, 11 Drawing Sheets

(51) Int. Cl.
*B01F 13/04* (2006.01)
*B01F 13/10* (2006.01)
*B01F 15/00* (2006.01)
*A47J 43/046* (2006.01)

(52) U.S. Cl.
CPC ........ *B01F 13/047* (2013.01); *B01F 13/1041* (2013.01); *B01F 15/00733* (2013.01); *B01F 15/00831* (2013.01); *B01F 2215/0026* (2013.01)

(56) References Cited

U.S. PATENT DOCUMENTS

| | | |
|---|---|---|
| 8,240,909 B2 | 8/2012 | Athey et al. |
| 8,360,480 B2 | 1/2013 | Athey |
| 9,527,052 B2 * | 12/2016 | Gushwa ................ A47J 43/042 |

\* cited by examiner

BLENDER JAR COLLARS AND INTERLOCKS

CROSS-REFERENCE TO RELATED APPLICATIONS

The present application represents a divisional application of and claims priority to U.S. patent application Ser. No. 14/561,665 entitled "BLENDER JAR COLLARS AND INTERLOCKS" filed Dec. 5, 2014, currently allowed.

FIELD OF THE DISCLOSURE

This disclosure relates generally to blenders and, more particularly, to blender jar collars and interlock mechanisms.

BACKGROUND

Blender jars are used to hold items, e.g., food items that are to be processed by, for example, liquefying, chopping, pureeing, etc. Most blender users want to be able to remove the blades from the blender jar in order to be able to clean the blades more effectively. Accordingly, in some examples, the blender jar is coupled to a collar having one or more rotating blades. The blades are rotated by a motor in the base of a blender base to which the jar-collar combination is coupled. Some codes agencies require that blender blades be prevented from spinning unless the blades are assembled to a jar to protect users.

SUMMARY

Disclosed herein are example collar assemblies coupleable to a blender jar having a ring, and to the base of a blender. The collar assembly including a housing to receive a bottom portion of the blender jar, a blade assembly mounted on an axis of the collar housing, a plunger moveable upward and downward within the collar housing. The plunger has a first lower position that prevents the blade assembly from coupling with a motor in the blender base when the collar is not coupled to the jar, and a second upper position where the plunger selectively allows the blade assembly to couple with the motor. The plunger further includes an arm extending upward within the collar housing and defining at least a u-shaped feature and a protrusion rotationally associated with the u-shaped feature. The collar assembly further includes a rotating interlock ring concentric with the collar housing and rotating responsive to rotation of the blender jar, and having a first portion, a second portions, and a key. The first portion engaging the u-shaped feature as the first portion rotationally moves into alignment with the u-shaped feature thereby preventing the plunger from moving upward toward the upper position, wherein the second portion does not engage the u-shaped feature when the second portion is rotationally aligned with the u-shaped feature thereby permitting the plunger to move upward and downward within the collar assembly, and wherein the key engages the protrusion as the plunger moves upward preventing the interlock ring from rotating while the second portion is rotationally aligned with the u-shaped feature.

A disclosed example blender jar assembly coupleable to the collar assembly of a blender includes a jar to receive items for processing, and a blender jar collar fixedly assembled to the base of the jar. The blender jar collar may include an interior lip engaging an exterior lip of the jar base. The blender jar collar and jar may be made of different materials.

DETAILED DESCRIPTION

Figure 1:
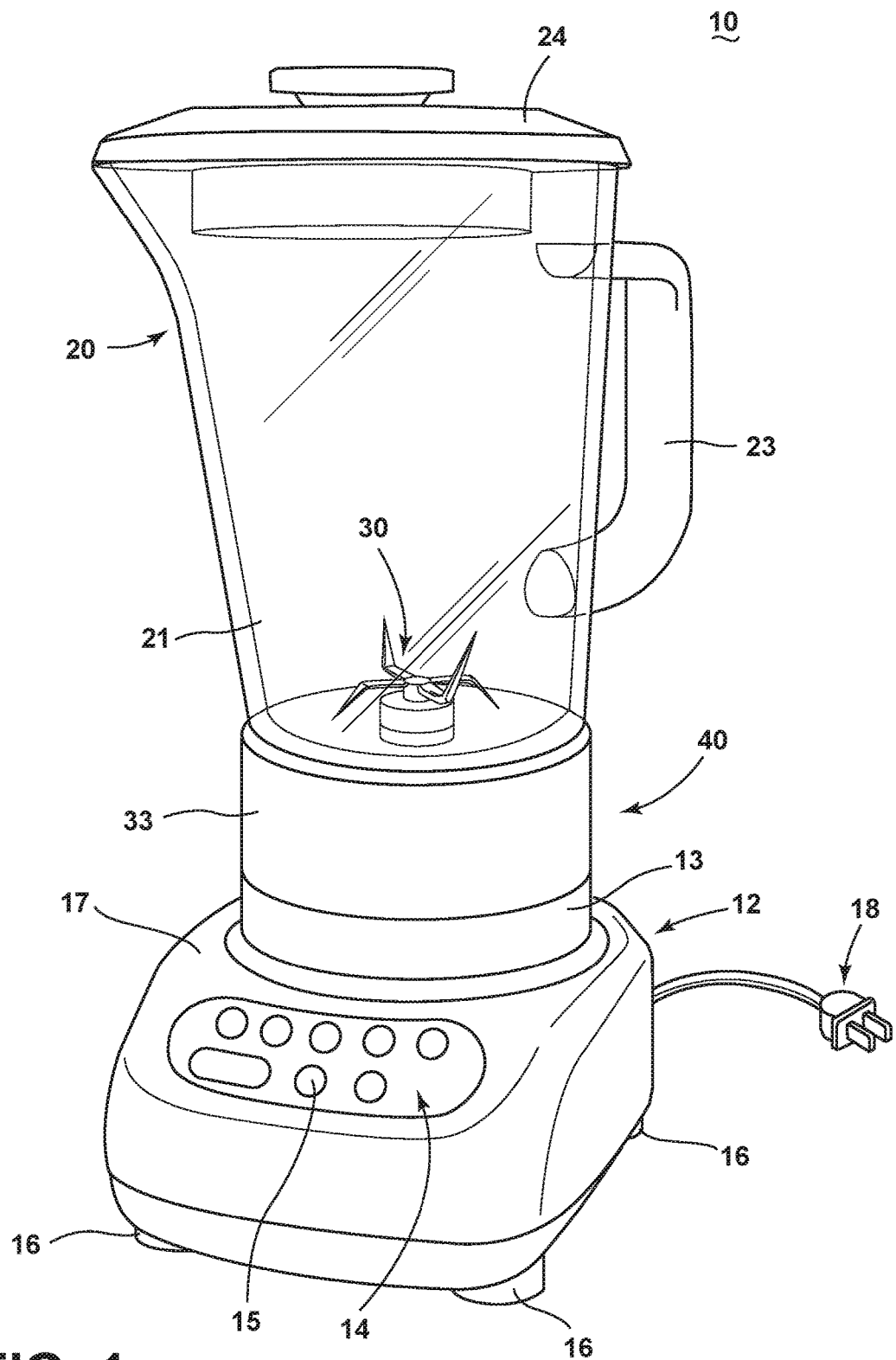
FIG. 1 is an isometric perspective view of an example blender having a jar with a blender jar collar, and a collar with an interlock mechanism, which are constructed in accordance with the teachings of this disclosure.

Electrical and mechanical interlocks can be used to reduce the likelihood of blades being moved while the blender jar is not coupled to the collar. In general, a mechanical interlock relies on an aspect of the physical coupling of the jar and collar to disable a mechanism that is intended to physically prevent the collar from coupling with a blender base. Many customers prefer glass blender jars due to their strength, scratch resistance, stain resistance, food-safe construction, etc. However, complex and/or precise features are difficult to mold with glass. This lack of precision may result in interlock mechanisms that can be defeated when enough force is intentionally applied by a user. For example, features defined in glass typically need to have sloped or curved sides and edges to prevent damage to the jar. Unfortunately, these sloped or curved sides and edges provide an opportunity to force a glass feature past a plastic member of the interlock mechanism, which may flex under a sufficient intentionally applied force. Thus, it is conceivable to intentionally and forcibly remove a blender jar from a collar while the collar remains coupled to the blender base, which is not the intention of the blender manufacturer. Other materials, such as stainless steel, may have similar challenges.

To overcome at least these problems, interlock mechanisms having more precise and/or complex features are disclosed herein. In some disclosed examples, a blender jar includes a collar ring fixedly assembled to the base of the blender jar. Because the disclosed collar rings can be formed of rigid plastic, more complex and/or precise features can be defined. Further, disclosed example collar rings can be designed for assembly to blender jars in ways that accommodate variations in the blender jar. Thus, the tolerance stack height of the blender jar-collar ring combination can be less than the blender jar by itself. Likewise, by flexibly and sealably coupling the collar ring to the blender jar, the collar ring as opposed to the blender jar can be used to seal the blender jar to the collar. Additionally or alternatively, the base of the blender jar can be sealed to the collar. However, because, the more precise collar ring can be more consistently sealed to the collar, further advantages may be obtained. Additionally, collar rings can be used to adapt different blender jars to different blenders without incurring the time and expense of designing and manufacturing additional blender jars. That is, a blender jar may be used with different blenders. Moreover, disclosed blender rings may be used to allow other materials, such as stainless steel, to be used to construct blender jars, even if they may conventionally not be suitable for use as blender jars.

Using blender jar assemblies having finer and/or more complex features are disclosed herein, novel interlock mechanisms having tighter tolerances that reduce the likelihood of being able to be disabled or bypassed can be realized. A disclosed example interlock collar assembly includes, among other things, an interlock ring and a plunger. When a blender jar is not attached to one of the example collars, the plunger is intended to be held in a lower or locked position. Thus, if a user tries to couple the collar assembly to a blender base without a jar being coupled to the collar, the plunger prevents the blender base from coupling with the collar assembly. Keying features on the blender jar and the collar allow the blender jar and collar assembly to be aligned. As the blender jar is twisted while aligned with and seated in the collar, a seal is formed between the blender jar and the collar assembly. Simultaneously, the interlock ring rotates, freeing the plunger to move upward. In examples where the plunger is spring-loaded, the plunger will remain in the lower position until the collar—jar combination is placed on the blender base. Once the collar—jar combination is coupled to the blender base, the plunger is free to move into an upper position, allowing the collar assembly and blender base to couple. One additional novel feature disclosed herein is that when the plunger is in the upper position (e.g., the jar is coupled to the collar assembly), the plunger prevents the interlock ring from rotating, which lowers the likelihood of incidental disassembly of the jar from the collar assembly while the jar is on the base. The assembly of this mechanism is also novel—all pieces permanently may be snapped together, versus requiring a heat staking operation. Yet another novel feature is that the keying features are physically smaller than previous designs, thereby making the interlock mechanism harder to defeat.

As used herein, terms such as up, down, top, bottom, side, end, front, back, etc. are used with reference to the normal or a currently considered orientation (e.g., a blender placed in and upright position on a work surface) of an item, member, assembly, element, etc. For example, with reference to a blender placed in an upright or operational position on a work surface. If any of these is considered with respect to another orientation, it should be understood that such terms need to be correspondingly modified.

As used herein, "fixedly assembled," or variants thereof, means an item, member, assembly, element, etc. that is intended to be, for all intensive purposes, permanently attached, coupled, connected, affixed, assembled or otherwise joined to another item during manufacture, product assembly, etc. in a way that is, by design, not intended for reversal by a user. Even though two items may be disassembled through sufficient knowledge, force, or tool does not negate the fact that they were intended, by design, to be fixedly assembled from the perspective of a user.

As used herein, "removeably attached," or variants thereof means an article, element, part, component, cover, support, mount, housing, or any other member that is reversibly attached to another member in a way that is intended, by design, for removal by hand or using a hand tool, without damage to any of the attached members.

Reference will now be made in detail to embodiments of this disclosure, examples of which are illustrated in the accompanying drawings. The embodiments are described below by referring to the drawings, wherein like reference numerals refer to like elements. Here, configurations of example blenders according to this disclosure will be described with reference to FIGS. 1-13.

Referring to FIG. 1, there is shown an example blender 10, which includes a base 12, a removable jar assembly 20, a blade assembly 30, and a collar assembly 40. The collar assembly 40 detachably couples the jar assembly 20 to the base 12, and detachably couples the blade assembly 30 to a motor within the base (not shown for clarity). According to embodiments of this disclosure, once secured in the collar assembly 40, the jar assembly 20 is prevented from be removed from the collar assembly 40, unless or until the collar assembly 40 is decoupled from the base 12. Also, the blade assembly 30 is prevented from coupling with the motor until the jar assembly 20 is secured in the collar assembly 40.

In general, the base 12 of the blender 10 has a neck 13 extending upwardly therefrom. A control pad 14 is supported by the base 12. The control pad 14 includes one or more controls 15 for operating the blender 10, such as membrane switches, buttons, dials, slides, or the like. The base 12 is supported above a countertop or other surface by a plurality of feet 16. The base 12 includes a housing 17, which is typically made of die-cast metal or a plastic such as polycarbonate. Electrical current is typically supplied to the base 12 by a plug 18, which is connectable to a wall outlet; however, one or more features of the blender 10 may alternatively be driven by battery power.

Figure 2:
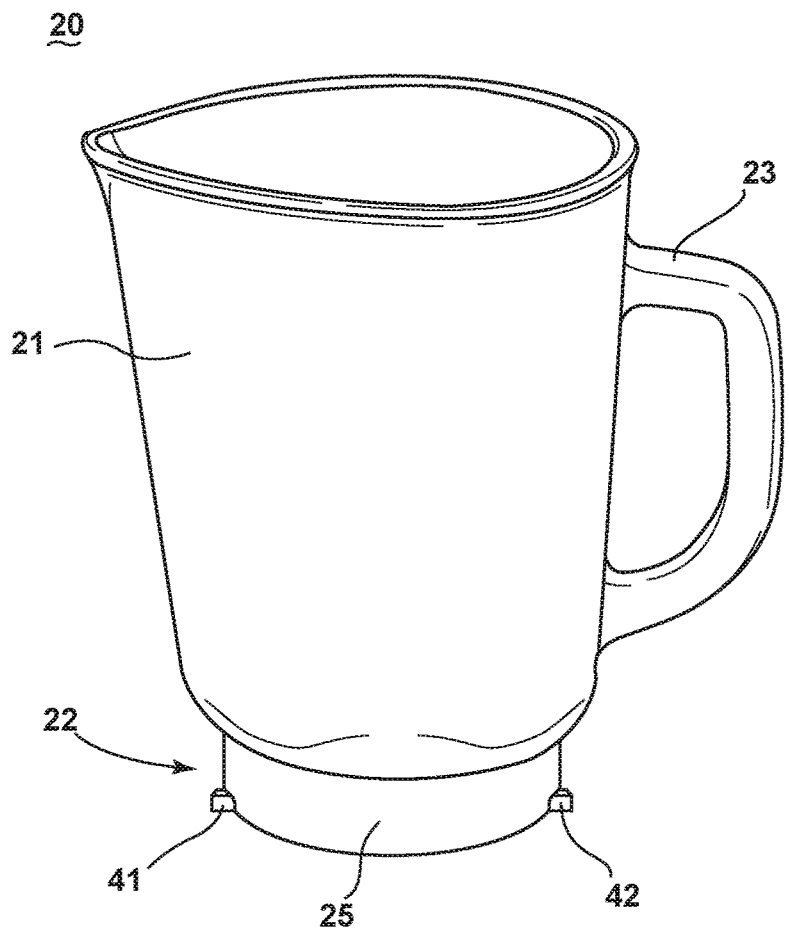
FIG. 2 is an isometric perspective view of the example blender jar of FIG. 1 having a ring constructed in accordance with the teachings of this disclosure.
Figure 3:
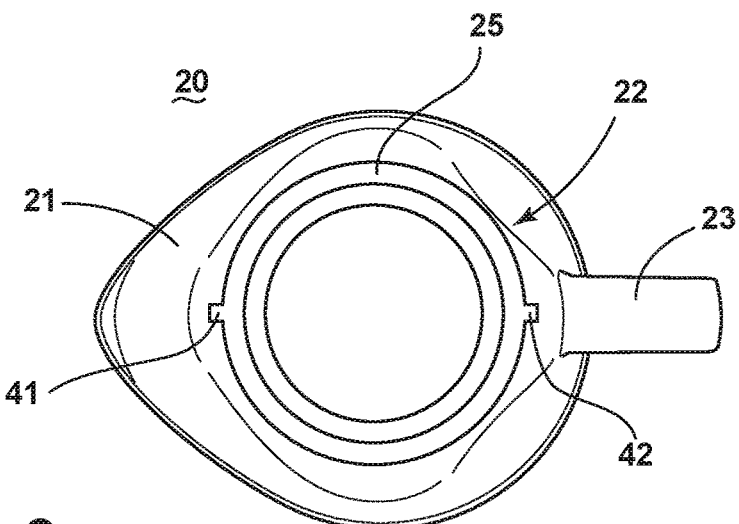
FIG. 3 is a bottom plan view of the example blender jar of FIG. 2.
Figure 4:
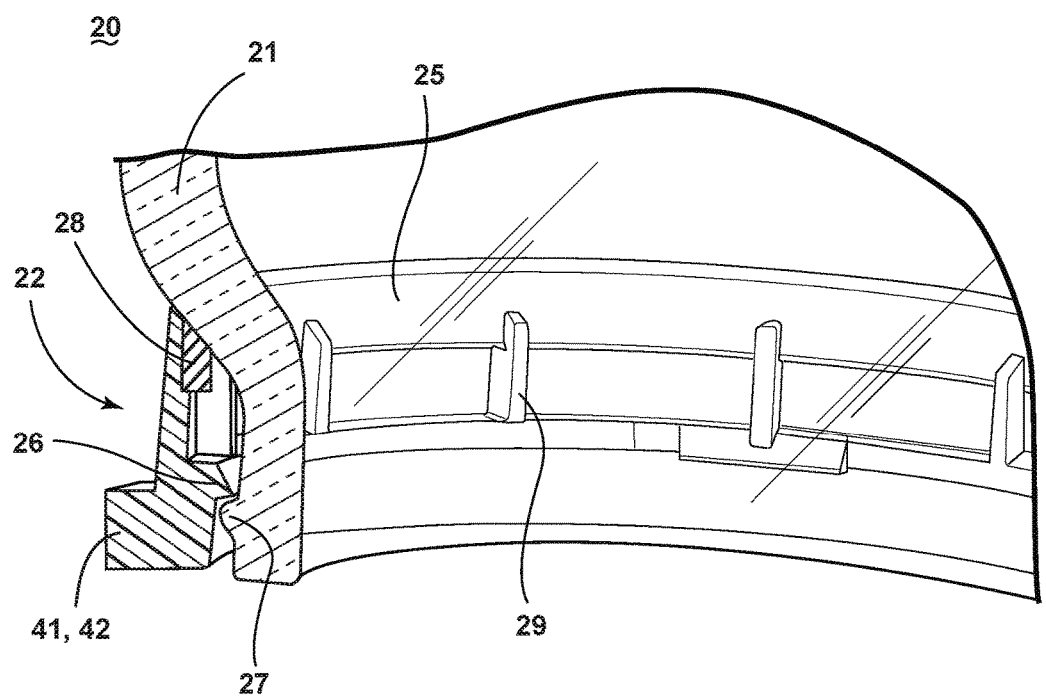
FIG. 4 is a cross-sectional view of the ring and the base of the example blender jar of FIG. 2.

As shown in FIGS. 2-4, the example jar assembly 20 includes a receptacle or jar 21, and a coupling portion 22 (see FIGS. 2 and 3). Typically, the jar 21 includes a handle 23, and a lid 24. The example coupling portion 22 includes a blender jar collar 25 that is assembled to the base portion the jar 21. As shown best in FIG. 4, the blender jar collar 25 has an interior lip 26 engaging an exterior lip 27 of the jar 21. In some examples, the blender jar collar 25 is press-fit or snapped onto the jar 21. Additionally or alternatively, the blender jar collar 25 may be molded onto the jar 21, or the blender jar collar 25 may be threaded onto the jar 21. Other means of assembling the blender jar collar 25 to the jar 21 are contemplated. The blender jar collar 25 may be formed of the same or a different material than the jar 21. For example, the blender jar collar 25 may comprise plastic, while the jar 21 comprises metal and/or glass.

To seal the blender jar collar 25 to the jar 21, the example coupling portion 22 of FIGS. 2-4 includes a seal 28, which is or becomes compressed between the blender jar collar 25 and the jar 21 as the blender jar collar 25 is press-fit, snapped, threaded, molded, etc. onto the jar 21. An example seal 28 comprises an O-ring, gasket, etc. In some examples, the blender jar collar 25 includes one or more ribs 29 that provide structural support for the blender jar collar 25 and/or help hold the seal 28 in place.

To engage the example interlock mechanism in the collar assembly 40 of FIG. 1, the blender jar collar 25 includes one or more outwardly extending protrusions or members, two of which are designated at reference numerals 41 and 42. As discussed below in connection with FIGS. 5-13, as the jar assembly 20 is rotated within the collar assembly 40, the protrusions 41, 42 rotate an interlock ring 31. Compared to the glass jar 21, the example protrusions 41, 42 are plastic, which allows for more precise protrusions and allows a more precise interlock mechanism. A more precise interlock mechanism makes it harder to forcibly remove the jar assembly 20 from the collar assembly 40.

Turning to FIGS. 5-13, an example manner of implementing the collar assembly 40 is shown. As is conventional, the example collar assembly 40 has a collar housing 33, and the blade assembly 30 mounted about an axis of the collar housing 33 (see FIG. 1). To implement an interlock mechanism, the collar assembly 40 includes the rotatable concentric interlock ring 31, and a plunger 43. The plunger 43 is able to move upward and downward within the collar housing 33 depending on the relative rotational position of the interlock ring 31 and the plunger 43. Arms 44 of the plunger 43 extend upward within the collar housing 33. In the example of FIGS. 5-13 there are two arms 44 on opposite sides of the collar housing 33; however, other numbers of arms 44 may be implemented. The arms 44 each have a u-shaped feature 45 to selectively receive different portions of the interlock ring 31 depending on the state of the interlock mechanism.

Figure 5:
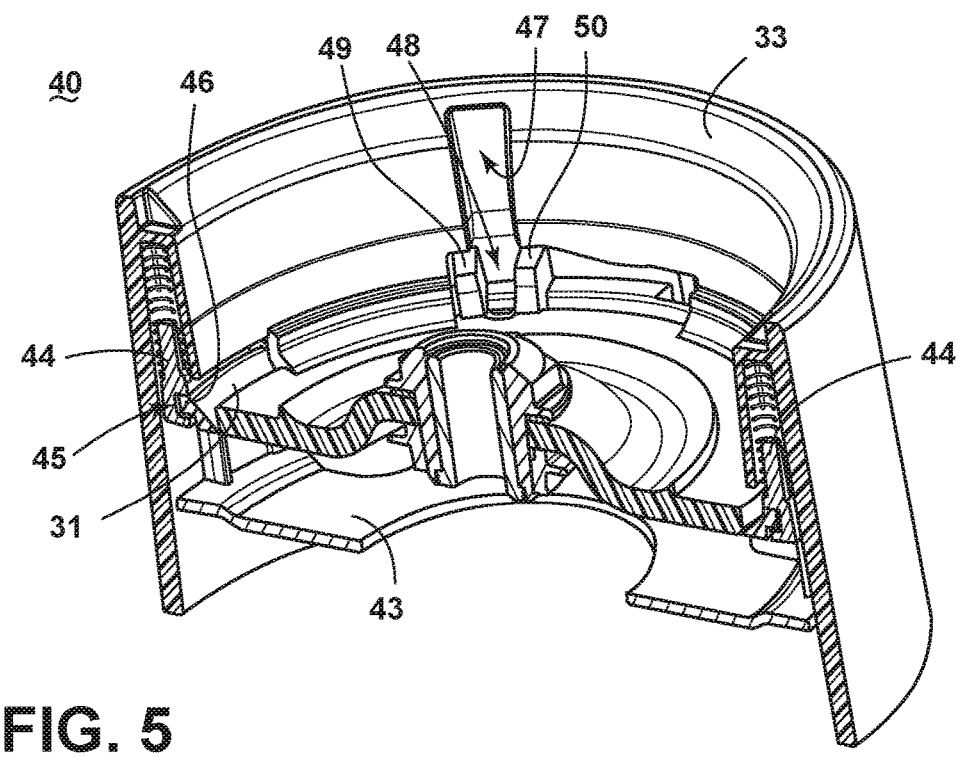
FIG. 5 is an isometric perspective cross-sectional view of the example blender collar of FIG. 1 in a locked state and having an interlock mechanism constructed in accordance with the teachings of this disclosure.
Figure 6:
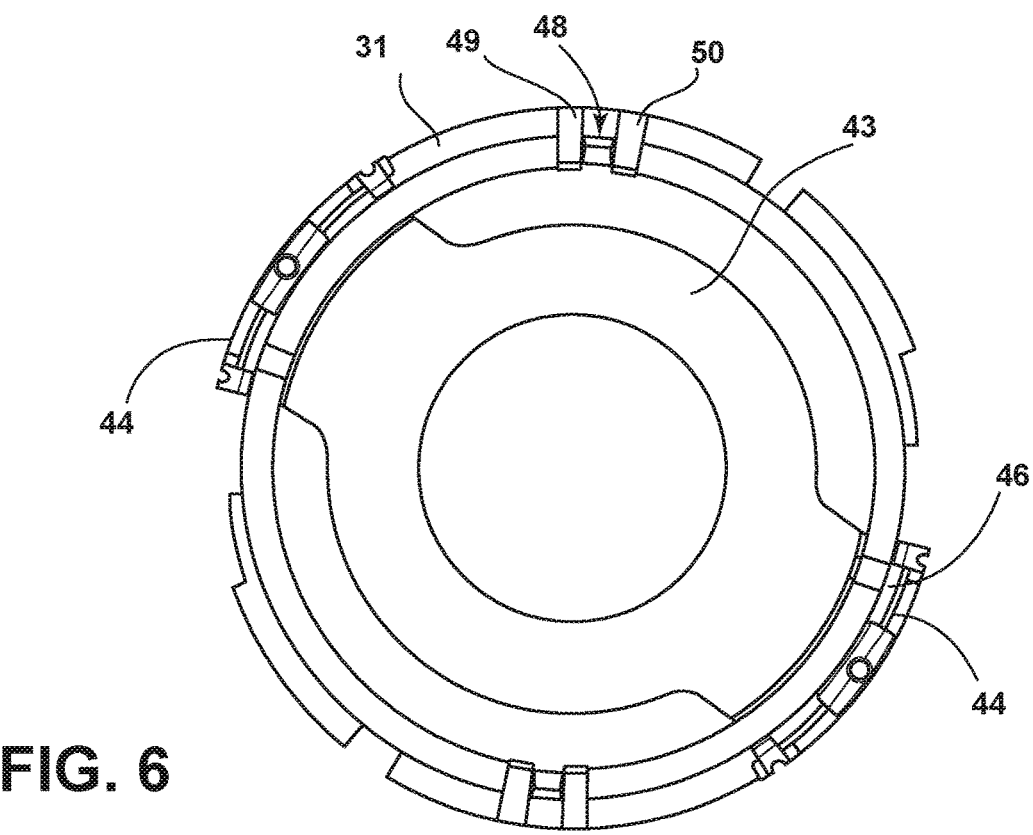
FIG. 6 is a top view of the plunger and interlock ring of FIGS. 2-5 in the locked state.
Figure 7:
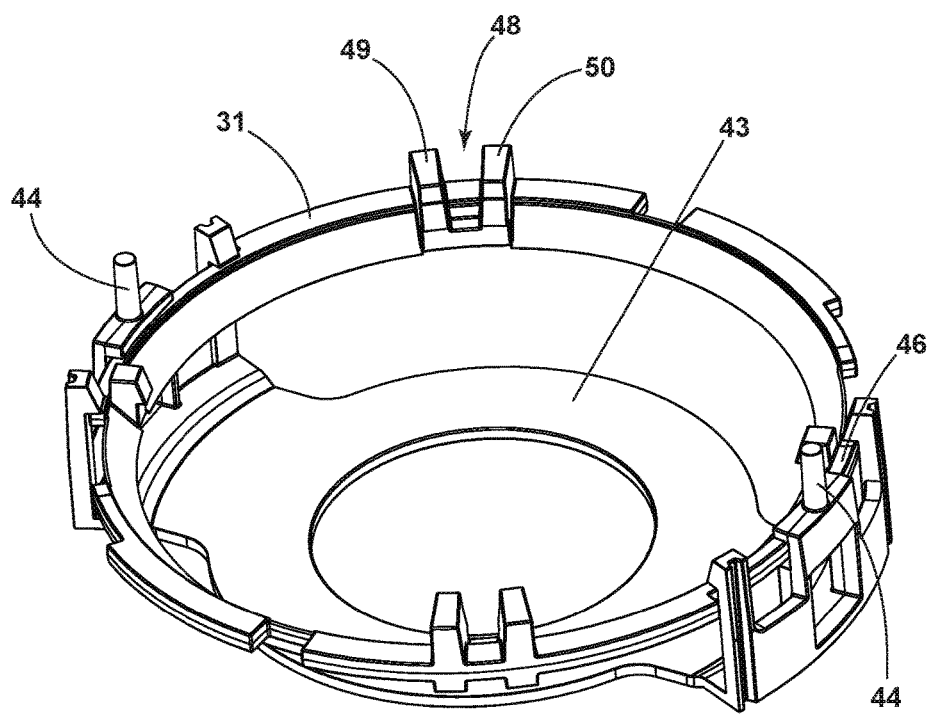
FIG. 7 is an isometric view of the plunger and interlock ring of FIGS. 2-5 in the locked state.

In FIGS. 5, 6, and 7, the interlock mechanism is depicted in its locked or plunger downward state. In the locked state, the plunger 43 is locked or held in its downward position, which prevents the collar assembly 40 from being coupled with base 12. In the locked position (i.e., a position where the collar assembly 40 cannot be coupled to the base 12), a portion 46 of the interlock ring 31 is positioned within the u-shaped feature 45. The engagement of the portion 46 of the interlock ring 31 in the u-shaped feature 45 of the plunger arm 44 holds the plunger 43 in its downward position.

The example collar housing 33 of FIGS. 5-13 has a channel 47 defined therein to receive one of the protrusions 41, 42, and to align the protrusion 41, 42 within a key 48 of the interlock ring 31. The example key 48 has two protrusions 49, 50 between which the protrusion 41, 42 is engaged. Rotation of the jar assembly 20 causes the key 48 to rotate the interlock ring 31 thereby. As shown, the interlock ring 31 has a notch corresponding to the interlock ring 31 in the downward position of the plunger 43.

Figure 8:
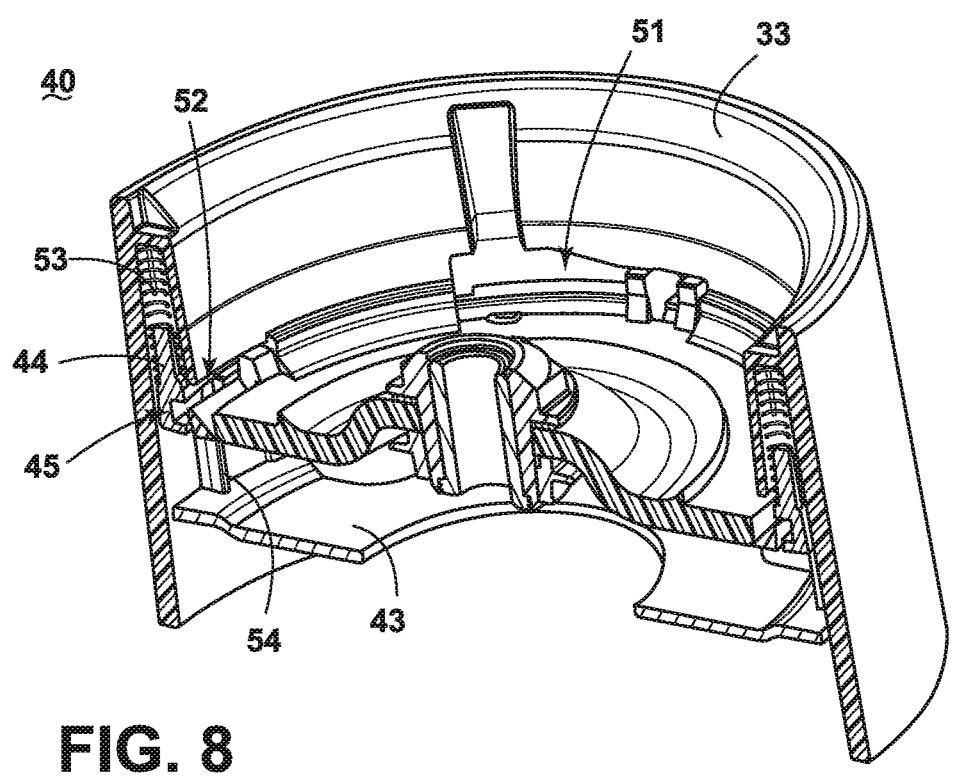
FIG. 8 is an isometric perspective cross-sectional view of the example blender collar of FIG. 1 in an unlocked state and having an interlock mechanism constructed in accordance with the teachings of this disclosure.
Figure 9:
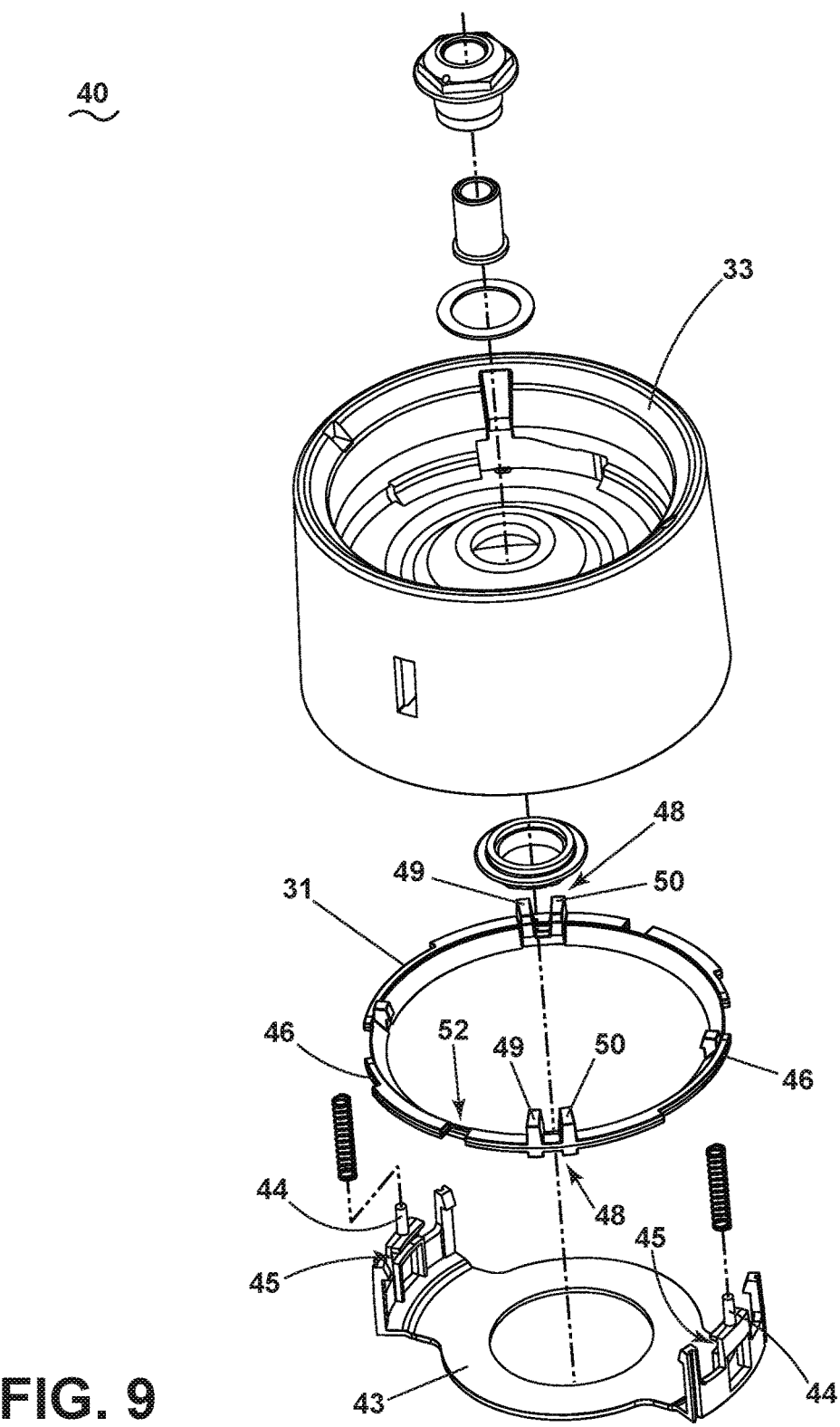
FIG. 9 is an exploded view of the example blender collar of FIG. 1 in an unlocked state and having an interlock mechanism constructed in accordance with the teachings of this disclosure.
Figure 10:
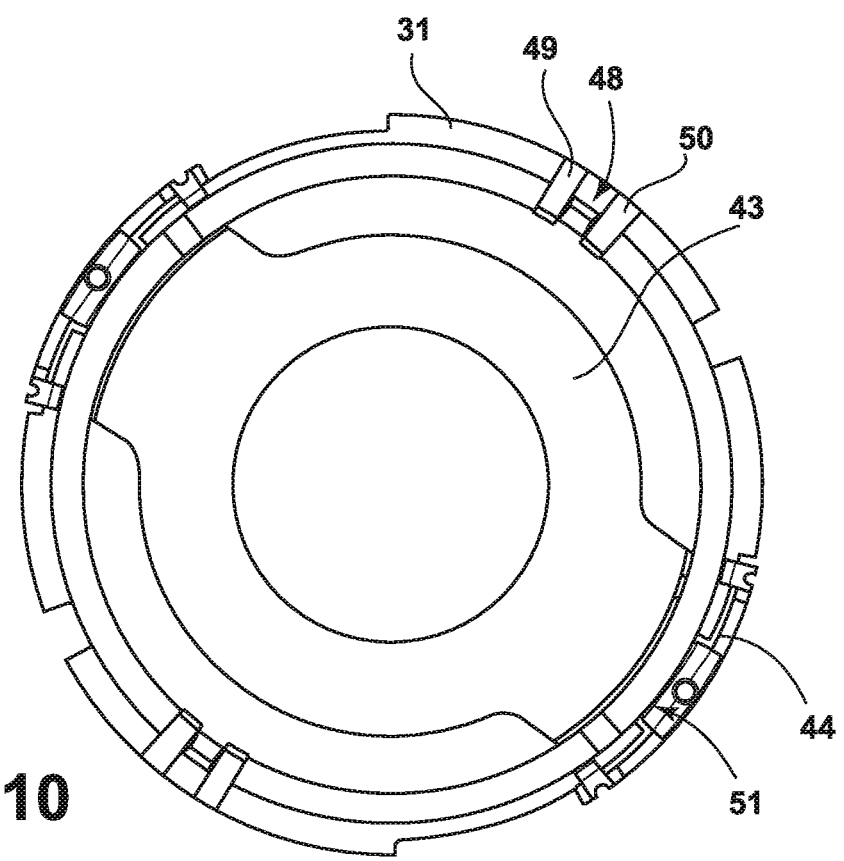
FIG. 10 is a top view of the plunger and interlock ring of FIGS. 2-4 and 8 in the unlocked state.
Figure 11:
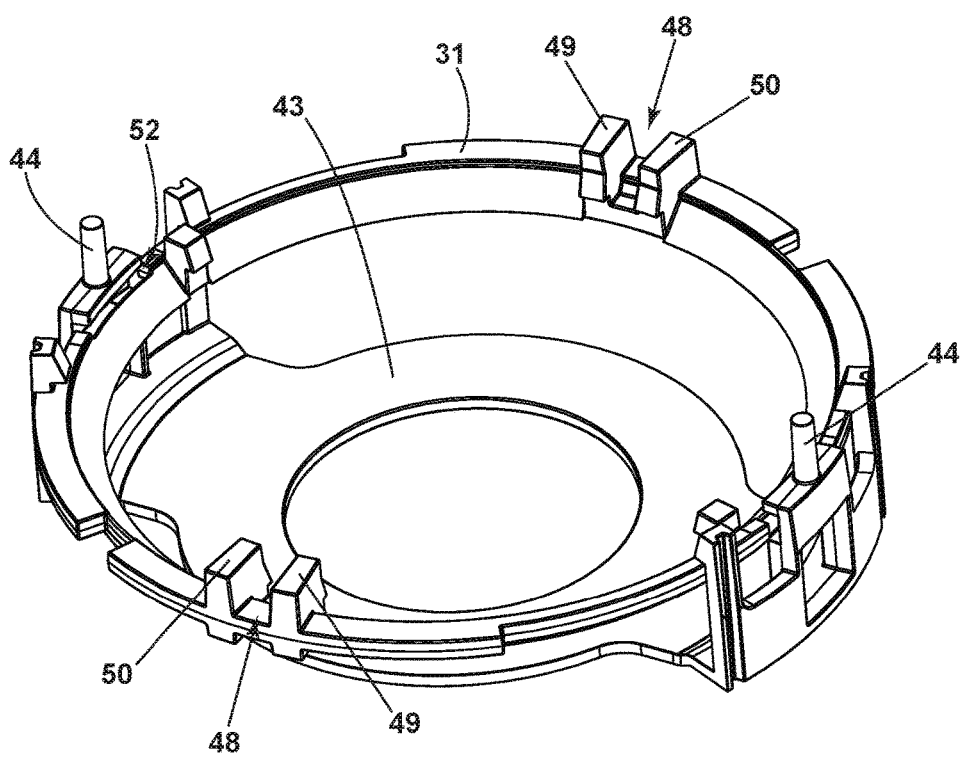
FIG. 11 is an isometric view of the plunger and interlock rings of FIGS. 2-4 and 8 in the unlocked state.

Turning to FIGS. 8, 9, and 10, as compared to FIGS. 5, 6, and 7, the interlock ring 31 has been rotated from its locked state to an unlocked state. A comparison of FIGS. 5 and 8 shows that the interlock ring 31 has been rotated clockwise due to the rotation of the jar assembly 20. In this state, the key 48 and the protrusion 41, 42 have be rotated clockwise within a horizontal slot 51. This horizontal slot 51 serves to help prevent the jar assembly 20 from being disassembled from the collar assembly 40 while the blender is being operated.

In the unlocked state of FIGS. 8, 9, and 10, a gap portion 52 in the interlock ring 31 is rotationally aligned with the u-shaped feature 45, but does not engage the u-shaped feature 45 because the gap portion 52 does not extend into the u-shaped feature 45. Accordingly, the plunger 43 is free to move up and down within the collar housing 33. In this condition, the collar assembly 40 may be coupled with the base 12. In some examples, springs 53 may be used to bias the plunger 43 into its downward position. However, the springs 53 may be omitted.

Figure 12:
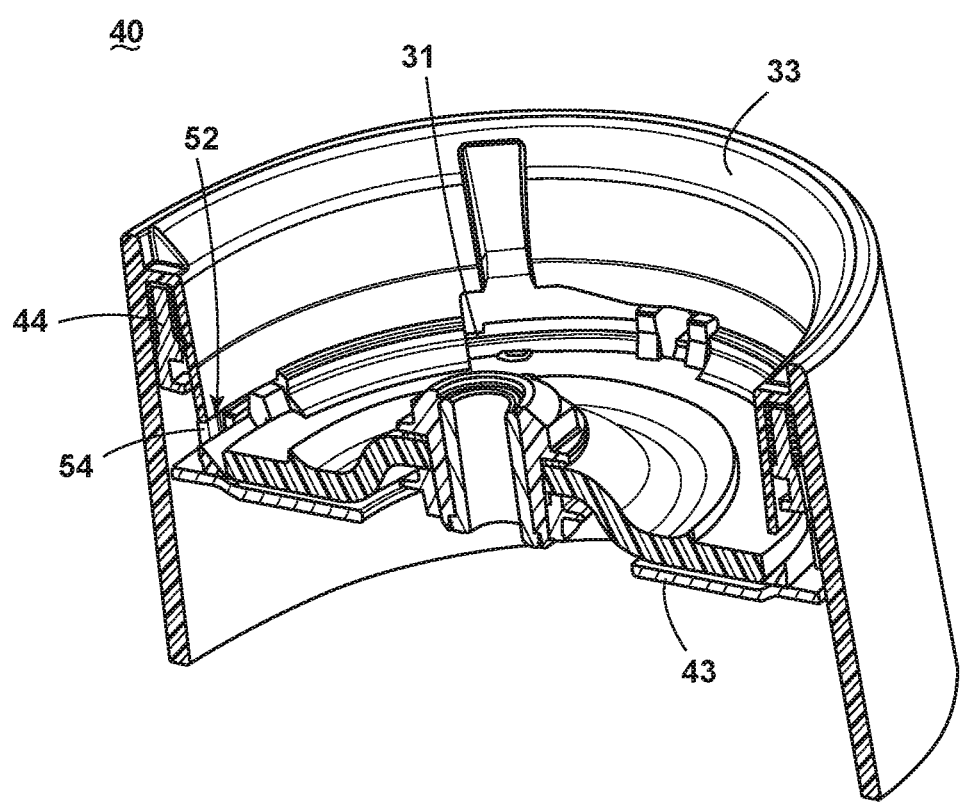
FIG. 12 is an isometric perspective cross-sectional view of the example blender collar of FIG. 7 with the plunger in an upward, unlocked position.
Figure 13:
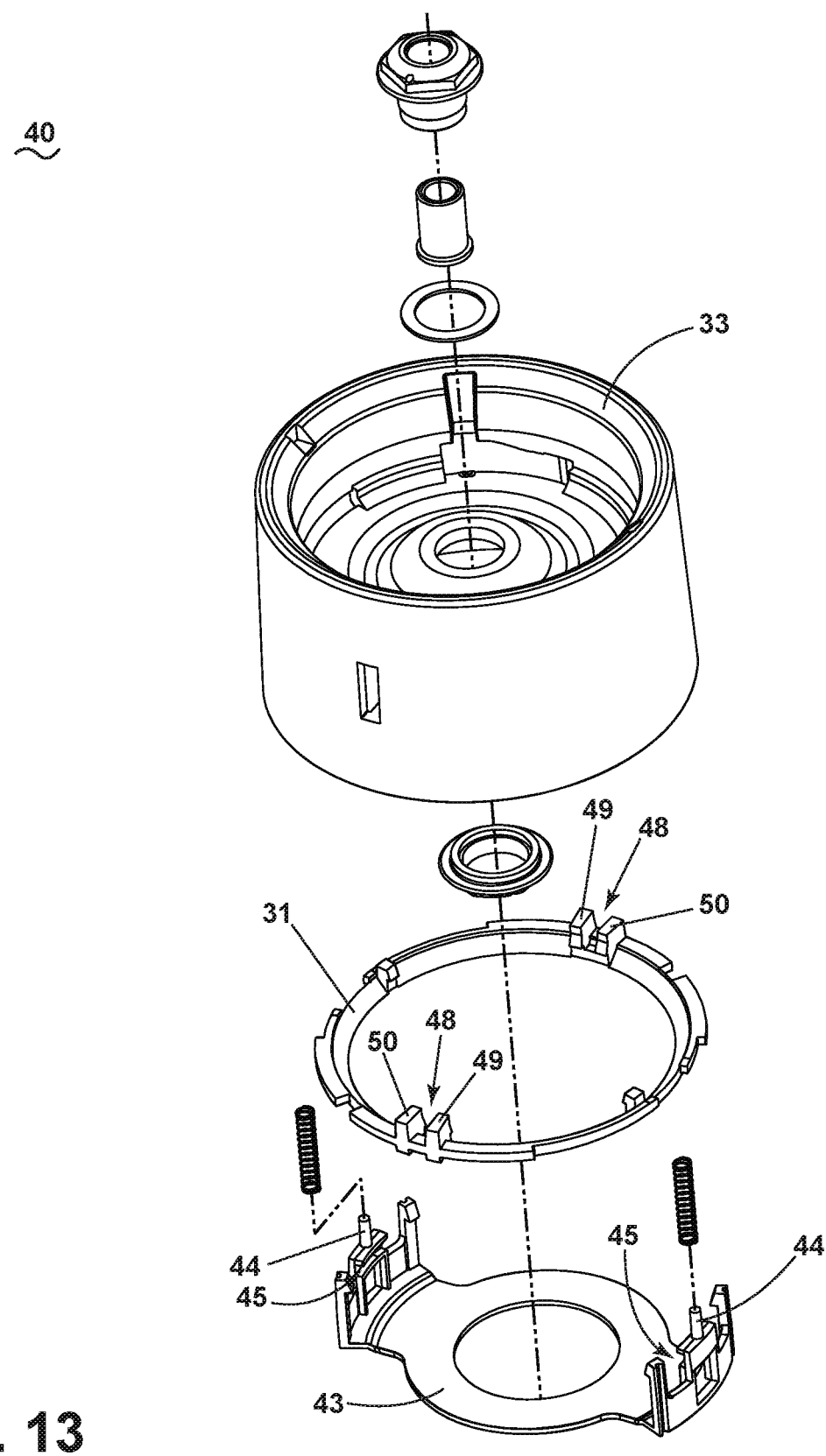
FIG. 13 is an exploded view of the example blender collar of FIG. 7 with the plunger in an upward, unlocked position.

FIG. 12 shows the locked state of FIGS. 8, 9, and 10 with the plunger 43 in its upward position such as occurs when the collar assembly 40 is, or is being coupled to the base 12. In this position, a portion 54 of the arm 44 moves upward into the gap 52. The portion 54 extends further toward the center of the collar assembly 40 than the u-shaped feature 45 and, thus is able to engage ends of the gap 52. Because the portion 54 extends into the gap 52, it prevents the jar assembly 20 from be rotated and becoming un-coupled from the collar assembly 40.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further still, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A blender jar assembly coupleable to a collar assembly of a blender, the blender jar assembly comprising:
   a blender jar to receive items for processing; and
   a blender jar collar assembly fixedly assembled to a base of the blender jar, the blender jar collar assembly comprising:
   a collar housing to receive a bottom portion of the blender jar;
   a blade assembly mounted on an axis of the collar housing;
   a plunger moveable upward and downward within the collar housing between a lower position where the plunger prevents the blade assembly from coupling with a motor in a blender base, and an upper position where the plunger allows the blade assembly to couple with the motor, the plunger including a base portion and an arm extending upward within the collar housing, the arm having:
   a u-shaped channel which extends in a circumferential direction and where an open portion of the u-shaped channel is oriented inwards and perpendicular to the circumferential direction;
   a stop protrusion positioned on the arm; and a slide protrusion having an upper portion adjacent the u-shaped channel and a lower portion extending towards the base portion; and a concentric interlock ring within the collar housing and rotating responsive to rotation of a blender jar, the interlock ring having:
- a first portion engaging the u-shaped channel as the first portion rotationally moves into alignment with the u-shaped channel thereby preventing the plunger from moving upward toward the upper position;
- a notch portion not engaging the u-shaped channel and not engaging the slide protrusion when the notch portion is rotationally aligned with the u-shaped channel and the slide protrusion thereby enabling the plunger to move upward and downward within the collar housing;
- a side portion of the notch portion engaging the slide protrusion as the plunger moves upward preventing the interlock ring from rotating the notch portion out of alignment of the slide protrusion while the plunger is raised above the lower position; and
- a tab portion which engages the stop protrusion on the arm when the interlock ring is rotated to limit rotational movement of the interlock ring.

2. The blender jar assembly of claim 1, further comprising a seal compressed between the blender jar collar assembly and the blender jar base.

3. The blender jar assembly of claim 1, wherein the blender jar collar assembly comprises a different material than the blender jar.

4. The blender jar assembly of claim 3, wherein the blender jar collar assembly comprises a plastic and the blender jar comprises at least one of a glass or a metal.

5. The blender jar assembly of claim 1, wherein the blender jar collar assembly is sealed to the jar.

6. The blender jar assembly of claim 1, wherein the interlock ring further has a key to receive a jar protrusion defined on the blender jar, the interlock ring rotating responsive to movement of the jar protrusion while positioned in the key.

7. The blender jar assembly of claim 6, wherein the collar housing comprises a horizontal slot to receive the key and the jar protrusion in the key, the horizontal slot at least partially retaining the blender jar on the collar assembly while the plunger is movable to the upper position.

8. The blender jar assembly of claim 6, wherein the collar housing has a vertical slot defined therein to align the blender jar with the collar housing and the interlock ring.

9. The blender jar assembly of claim 8, wherein the collar assembly is coupled to the blender jar as the blender jar:
- is inserted into the collar housing engaging the vertical slot and the key; and
- is rotated to rotate the interlock ring from a first rotational position where the first portion of the interlock ring engages the u-shaped channel to a second rotational position where the notch portion of the interlock ring is rotationally positioned at the u-shaped channel.

10. The blender jar assembly of claim 1, further comprises a spring biasing the plunger downward when the notch portion is rotationally positioned at the u-shaped channel.

11. The blender jar assembly of claim 1, wherein the first portion of the interlock ring engages the u-shaped channel when the blender jar is not coupled to the collar assembly.

* * * * *